Oct. 28, 1941.  D. T. COOPER  2,260,933
FREQUENCY METER
Filed June 30, 1939
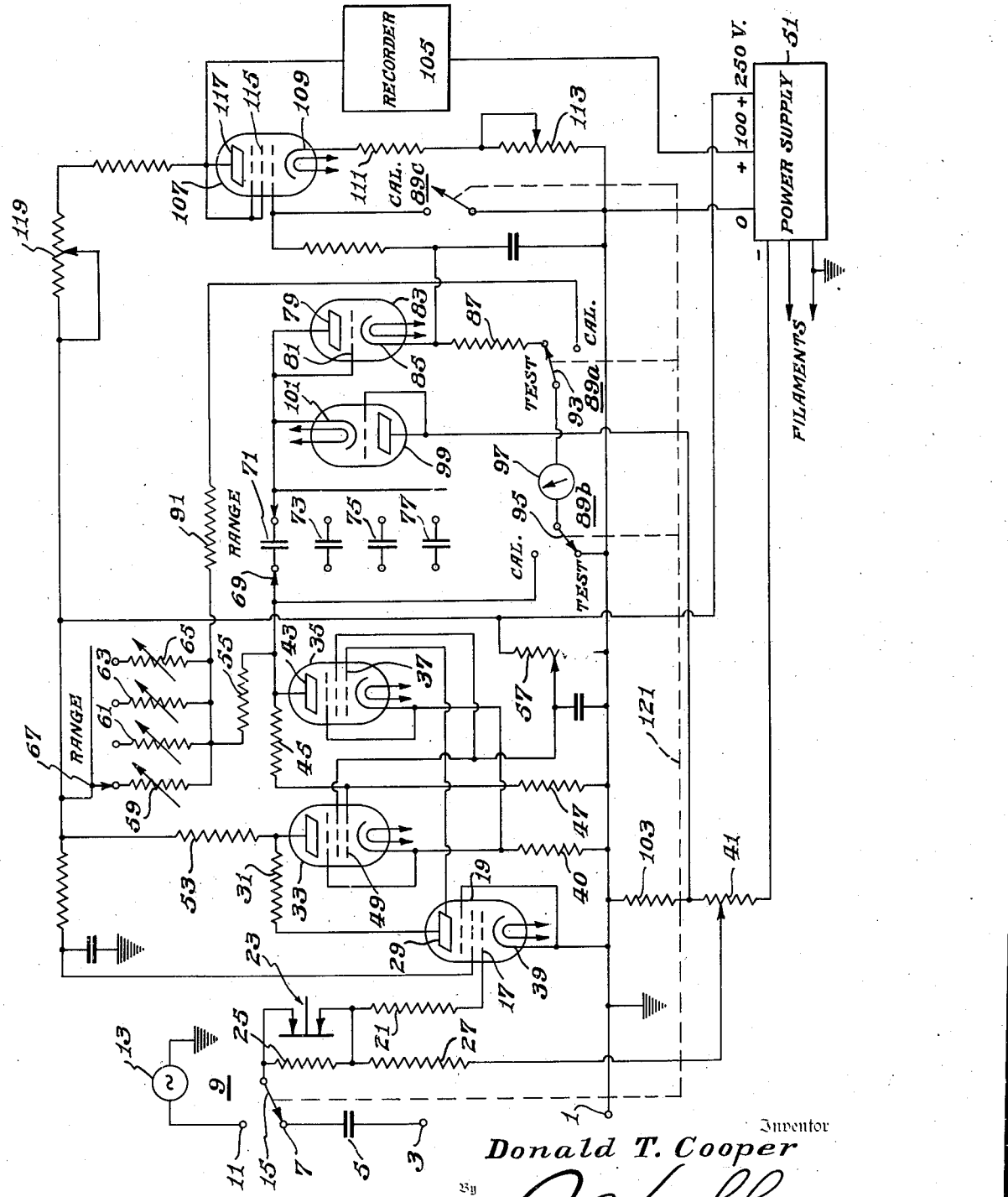

Patented Oct. 28, 1941

2,260,933

UNITED STATES PATENT OFFICE 2,260,933

FREQUENCY METER

Donald T. Cooper, Philadelphia, Pa., assignor to Radio Corporation of America, a corporation of Delaware Application June 30, 1939, Serial No. 282,215

11 Claims. (Cl. 175—368)

This invention relates to measuring devices, and more particularly to instruments for measuring, indicating and recording the frequency of electric oscillations. It is to be understood, however, that the term "the frequency of electric oscillations" includes the frequency of any electric current or voltage alteration which varies with time, regularly or irregularly, and without regard to its wave shape.

One of the objects of this invention is to provide an improved frequency meter. Other objects include the provision of a frequency meter which is readily adapted for use over a wide range of frequencies; the provision of an accurate frequency meter which operates independent of changes in the amplitude and wave shape of the voltage which is to be measured within the limits of the apparatus; and the provision of a frequency indicating device having a self-contained calibrating system, and which may readily be checked for proper operations without removing the device from its operating set-up.

This invention will be better understood from the following description when considered in connection with the accompanying drawing, and its scope is indicated by the appended claims. The figure of the drawing illustrates a preferred embodiment of this invention.

Referring to the drawing, a pair of input terminals 1 and 3 are connected, respectively, to ground and one terminal of a coupling capacitor 5. The remaining terminal of capacitor 5 is connected to one contact point 7 of a two-way switch 9. The other contact point 11 is connected to a source of alternating voltage 13, which may be a low voltage transformer connected to the alternating current line, such as the filament supply transformer, or the like. The arm 15 of switch 9 is connected to the control grid 17 of a thermionic amplifier tube 19 through a grid current limiting resistor 21 and a push button type switch 23 which is normally closed. A small resistor 25 is connected across the push button switch 23 so that it is normally not in the circuit. A grid leak resistor 27 is connected between the input end of the limiting resistor and the movable arm of a potentiometer 41 which supplies a negative bias for the amplifier tube 19.

The anode 29 of the amplifier tube 19 is connected through an anode load resistor 31 to the anode of the first of a pair of direct coupled multivibrator tubes 33 and 35. Anode 29 is also connected directly to the grid 37 of the second multivibrator tube 35. The cathode 39 of the amplifier tube 19 is connected to ground. Resistor 31 and the anode-cathode path of the amplifier 19 thus form a voltage dividing attenuator, and the voltage derived therefrom is applied to the grid 37 of the second multivibrator tube 35. The voltage which is to be measured varies the cathode-anode impedance of the amplifier tube 19 and the grid voltage of the second multivibrator 35 is varied accordingly.

The anode 43 of the second multivibrator tube 35 is connected to the high end of a voltage divider comprising the two resistors 45 and 47, the low end of which is grounded. The junction of the two resistors is connected to the control grid 49 of the first multivibrator 33. Energizing potential for the multivibrator tubes is supplied from a suitable power supply 51 through a pair of load resistors 53 and 55. The cathodes of both multivibrator tubes are connected to ground through a biasing resistor 40. Screen grid potential for the multivibrator tubes is supplied from a potentiometer 57 which is connected across the positive direct voltage source. This potentiometer provides a convenient means of adjusting the maximum anode current of the tubes. A further control which provides individual adjustment of the anode current in each of the operating ranges includes resistors 59, 61, 63 and 65, one of which is connected in series with the anode load resistor 55 by means of a switch 67 operable with the main frequency range switch.

Output from the multivibrator is taken from the anode of the second multivibrator tube 35. The anode 43 is connected to section 69 of the range selector switch which connects one of a number of capacitors 71, 73, 75 and 77 between the multivibrator output and the anode and grid electrodes 79, 81 of a low impedance diode-connected triode 83, the cathode 85 of which is connected through a load resistor 87 to one contact of the first section 89a of a calibrating switch. The remaining contact of the first section of the calibrating switch is connected through a resistor 91 to the end of plate load resistor 55 which is remote from the multivibrator tube. The movable arm 93 of the first section of the calibrating switch 89a is connected to the movable arm 95 of the second section 89b of the switch through a direct current milliammeter 97. The second section of the switch is adapted to connect the meter 97 either to ground or to the anode 43 of the second multivibrator tube 35.

A second low impedance triode 99 is connected as a diode rectifier of opposing polarity in parallel with triode 83. Its cathode 101 is connected to the grid and anode of triode 83, while its grid and anode electrodes are connected to ground through a source of bias obtained across a resistor 103, the purpose of which is to prevent a no signal current flow through the tube.

While the apparatus which has been described so far is a complete frequency indicator, an additional feature has been included by means of which a recorder 105 or similar device may be operated to make a permanent record of the frequency of the input voltage.

An output voltage is taken from the cathode of rectifier 83 and impressed on the grid of a cathode follower amplifier tube 107. The cathode 109 is grounded through a load resistor 111 which may be connected in series with a variable resistor 113. A third section 89c of the calibrating switch is adapted to connect the grid of amplifier 107 to ground when the switch is in the "calibrate" position. The screen and anode electrodes 115 and 117 are connected to the recorder 105, through which the anode energizing potential is supplied from a medium voltage tap, say +100 volts. To prevent zero signal current from operating the recorder, the anode 117 is also connected to a higher source of potential, say 250 volts, through a variable resistor 119.

The operation and adjustment of this frequency indicator will now be described. The two multivibrator tubes 33 and 35 are adapted to alternate in opposite sense between two states of conduction, in response to a keying voltage. The tubes are regeneratively interconnected so that if a keying voltage is applied to the grid of one of the tubes, the resultant effect is to interchange the states of the two tubes. The changed state is then maintained until a second keying voltage is applied to the grid. It is an aperiodic multivibrator which will stay in a given state until keyed. Keying is accomplished by means of a change in the impedance of tube 19.

Assume that tube 33 is drawing a large anode current. There is then a large voltage drop across its anode load resistor 53 and the anode voltage of tube 33 is quite low. A proportional part of this voltage is impressed directly on the grid of the other multivibrator tube 35. The bias voltage developed by biasing resistor 40 is sufficient to overcome the small positive grid voltage and tube 35 is therefore biased substantially to cut off, or at least to a low value of anode current. However, the actual value of the small positive grid voltage is determined by the attenuation ratio of the voltage divider which includes resistor 31 and the cathode-anode impedance of amplifier tube 19. When the applied voltage which is under observation increases the impedance of this tube, the voltage on the grid of tube 35 is thereby made more positive, and the tube begins to draw current. This makes its anode 43 less positive and therefore the grid of the first multivibrator tube becomes less positive. This reduces the anode current in resistor 53, making the voltage on the grid of tube 35 still more positive.

It is seen that a regenerative action is produced, and the grid will rapidly continue to become more positive until anode current saturation is reached. Tube 35 is then drawing a large anode current and tube 33 will be cut off, since the grid voltage of the latter is dependent upon the anode voltage of the former. The successive half cycle of the applied voltage then decreases the cathode-anode impedance of the amplifier tube and the process is reversed. Due to the regenerative action, the change from one condition to the other is accomplished very rapidly. The change of conductivity of the multivibrator tubes is initiated by the impulse to be measured but the actual anode current is not proportional to its amplitude.

A square wave voltage is produced across the anode load resistor 55. The amplitudes of successive impulses are constant regardless of the amplitude of the applied alternating voltage, assuming that the applied voltage is of sufficient amplitude to control the multivibrator. I have found that the applied voltage may vary between 2 and 200 volts without changing the indication of the meter.

The purpose of push button 23 is to determine whether or not the input voltage has sufficient amplitude to properly control the multivibrator. Pushing the button connects resistor 25 in series with the input, thus reducing the sensitivity of the devices by reducing the voltage which reaches the amplifier grid. If the deflection of meter 97 does not change when the push button is pressed, the device is operating as it should. If, however, the reading changes, it indicates that the input voltage is not of sufficient amplitude. That is, if the amplitude of a given input voltage is sufficient to operate the device when its sensitivity is less than normal, the amplitude will certainly be sufficient to operate the device at normal sensitivity.

The square wave voltage of constant amplitude is fed to a condenser, resistor, rectifier network including one of the capacitors 71 to 77, resistor 87 and rectifier 83, the time constant of which is such that the selected capacitor will be at least 99 percent discharged during subsequent half cycles at the highest frequency to be used in any given range. By concurrently selecting a capacitor of a particular size and one of the variable resistors 59 to 65, each range may be separately calibrated to give, for example, half scale deflection at the mid frequency.

The integrated current impulses which successively charge and discharge the selected capacitor pass, respectively, through the two rectifiers 83 and 99. One half of the current will also pass through meter 97 to produce an indication which is directly proportional to the frequency of the integrated impulses.

In order to provide a convenient means of checking the calibration of the device, a "test"-"calibrate" switch 89a, 89b, and 89c has been provided. This switch includes the single pole switch 9 and the three sections of the switch 89a—89b—89c. In the "Cal" position, switch 9 connects an alternating voltage of any frequency, 60 cycles, for example, to the amplifier input. The amplitude of this voltage is sufficient to control the multivibrator. Switch sections 89a and 89b connect the indicator meter 97 as a voltmeter across the anode load resistor 55, and it therefore indicates the amplitude of the square wave voltage. This amplitude is then set to a predetermined level by means of potentiometer 57. Switch section 89c prevents the open grid of amplifier 107 from permitting a damaging anode current to flow in the tube. The several switch sections may be coupled together for uni-control. The common control coupling of the switches is represented by dotted line 121.

I claim as my invention:

1. A device of the character described which includes a control tube, means for varying the impedance of said tube in accordance with the alternations of a voltage whose frequency is to be measured, a pair of thermionic tubes having grid and anode electrodes and adapted to alternate between two states of conduction in response to said variations in impedance, the grid electrode of each tube being impressed with a direct potential proportional to the anode potential of the other tube, means for deriving an impulse of constant peak amplitude from one of said thermionic tubes upon the occasion of each such alternation, and means responsive to successive derived impulses for producing a current, the average amplitude of which is proportional to the frequency of said impulses.

2. A device of the character described which includes a pair of thermionic tubes having grid and anode electrodes and adapted to alternate in an opposite sense between conditions of anode current cut-off and anode current saturation in response to a control voltage, means for deriving an impulse of constant amplitude from one of said thermionic tubes upon the occasion of each such alternation, and means responsive to successive derived impulses for producing a current the average amplitude of which is proportional to the frequency of said impulses.

3. A device of the character described which includes a pair of thermionic tubes having grid and anode electrodes, a source of energizing voltage, means including a resistor connecting each anode electrode to said source, means including a resistor connecting each anode electrode to said source, means including a pair of voltage dividing attenuators for impressing a portion of the voltage of the anode of each tube on the grid of the other tube throughout the operating cycle, means for varying the attenuation of one of said attenuators in accordance with a signal so that said tubes alternate between two conductive states upon the occasion of each change in attenuation, means for deriving an impulse of constant amplitude from one of said thermionic tubes upon the occasion of each such alternation, and means responsive to successive derived impulses for producing a current the average amplitude of which is proportional to the frequency of said impulses.

4. A device of the character described in claim 3 in which said voltage dividing attenuator which is adapted to be varied includes a thermionic tube.

5. A device of the character described which includes a pair of thermionic tubes adapted to alternate in an opposite sense between two states of conduction, said alternate states being initiated by an alternating voltage whose frequency is to be measured, means interconnecting said thermionic tubes so that a voltage applied to one of said tubes is automatically applied by said tube to its interconnected tube to maintain said tubes in their respective states during each half cycle of said alternating voltage, means for deriving an impulse of constant amplitude from one of said thermionic tubes upon the occasion of each such alternation, and means responsive to successive derived impulses for producing a current the average amplitude of which is proportional to the frequency of said impulses.

6. A device of the character described which includes a pair of thermionic tubes adapted to alternate in an opposite sense between two states of conduction, said alternate states being initiated by an alternating voltage whose frequency is to be measured, means interconnected with said tubes for maintaining said tubes in their respective states during each half cycle of said alternating voltage, a capacitor connector to one of said tubes for producing current impulses of successively constant peak amplitudes upon the occasion of such alternations of state, a meter for indicating the average amplitude of said current impulses, and means including said meter to indicate the peak amplitude of said impulses.

7. A device of the character described which includes a pair of thermionic tubes adapted to alternate in an opposite sense between two states of conduction in accordance with an alternating voltage of predetermined amplitude whose frequency is to be measured, said states of conduction being independent of the amplitude of said alternating voltage above said predetermined amplitude, means interconnecting said thermionic tubes so that a voltage applied to one of said tubes is automatically applied by said tube to its interconnected tube to maintain said tubes in their respective states during each half cycle of said alternating voltage, a capacitor connected to one of said tubes for producing current impulses having successively constant peak amplitudes, the duration of said impulses being substantially less than the interval between successive impulses, and means for indicating the average amplitude of said current impulses.

8. In a device of the character described, a pair of thermionic tubes having input and output circuits, means coupling the output circuit of each tube to the input circuit of the other so that a condition of maximum conductivity in one of said tubes produces a condition of minimum conductivity in the other of said tubes, means responsive to an alternating voltage for causing said conditions of conductivity to be interchanged, means for deriving charging impulses from one of said pair of tubes, a capacitor adapted to be charged by said impulses, and current responsive means in circuit with said capacitor.

9. In a device of the character described, a pair of thermionic tubes having input and output circuits, means coupling the output circuit of each tube to the input circuit of the other so that a condition of maximum conductivity in one of said tubes produces a condition of minimum conductivity in the other of said tubes, a third thermionic tube in circuit with said coupling means, means for varying the impedance of said third tube in response to an alternating voltage for causing said conditions of conductivity to be interchanged, means for deriving charging impulses from one of said pair of tubes, a capacitor adapted to be charged by said impulses, and current responsive means in circuit with said capacitor 10. In a device of the character described, a pair of thermionic tubes having input and output circuits, means coupling the output circuit of each tube to the input circuit of the other so that a condition of maximum conductivity in one of said tubes produces a condition of minimum conductivity in the other of said tubes, means responsive to an alternating voltage for causing said conditions of conductivity to be interchanged, means for deriving charging impulses from one of said pair of tubes, a capacitor coupled to said one tube and adapted to be charged by said impulses, and means for indicating the average amplitude of the charging currents of said capacitor to determine the frequency of said alternating voltage.

11. A frequency indicator which includes variable impedance means, means for varying said impedance in accordance with the instantaneous amplitude of a voltage whose frequency is to be indicated, a pair of discharge devices having input and output circuits, means interconnecting said circuits so that voltages applied to one of said pair of discharge devices are regeneratively applied by said one device to the other of said devices and vice versa for causing said devices to alternate between opposite predetermined conditions of conductivity in response to variations in said variable impedance means, means for deriving impulses from said alternations, and means for indicating the average amplitude of said impulses as a measure of the frequency of said voltage.

DONALD T. COOPER.